United States Patent [19]

Rumreich

[11] Patent Number: 5,177,613
[45] Date of Patent: Jan. 5, 1993

[54] QUASI-PARALLEL IF WITH SHARED SAW FILTER

[75] Inventor: Mark F. Rumreich, Indianapolis, Ind.

[73] Assignee: Thomson Consumer Electronics, Inc., Indianapolis, Ind.

[21] Appl. No.: 485,207

[22] Filed: Feb. 26, 1990

[51] Int. Cl.⁵ .............................. H04N 5/60
[52] U.S. Cl. ............................ 358/198; 358/197
[58] Field of Search ............ 358/23, 188, 196, 197, 358/198, 160

[56] References Cited

U.S. PATENT DOCUMENTS

| | | | |
|---|---|---|---|
| 4,107,730 | 8/1978 | Jones | 358/196 |
| 4,199,787 | 4/1980 | Craft | 358/197 |
| 4,237,485 | 12/1980 | Saito et al. | 358/197 |
| 4,263,611 | 4/1981 | Gibson et al. | 358/23 |
| 4,316,220 | 2/1982 | Muterspaugh et al. | 358/196 |
| 4,353,093 | 10/1982 | Durbin, Jr. et al. | 358/160 |
| 4,470,070 | 9/1984 | Griffis | 358/198 |
| 4,490,743 | 12/1984 | Mycynek et al. | 358/197 |
| 4,496,979 | 1/1985 | Yu et al. | 358/197 |
| 4,511,924 | 4/1985 | Griffis et al. | 358/197 |
| 4,513,323 | 4/1985 | Patel | 358/197 |
| 4,514,763 | 4/1985 | Rindal | 358/167 |
| 4,551,756 | 11/1985 | Ogawa et al. | 358/197 |
| 4,602,287 | 7/1986 | Fockens | 358/197 |
| 4,602,288 | 7/1986 | Everett | 358/197 |
| 4,630,119 | 12/1986 | Okuno | 358/197 |
| 4,639,786 | 1/1987 | Tamer et al. | 358/197 |
| 4,660,087 | 4/1987 | Rumreich | 358/197 |
| 4,660,088 | 4/1987 | Lagoni et al. | 358/197 |
| 4,716,464 | 12/1987 | Parker | 358/197 |
| 4,718,086 | 1/1988 | Rumreich et al. | 358/198 |
| 4,811,096 | 3/1989 | Gakumura | 358/160 |
| 4,974,087 | 11/1990 | Rumreich | 358/198 |

OTHER PUBLICATIONS

Television Gijutsu issue of Sep. 1985, pp. 49–55, along with English language translation.
New PIF+SIF IC For Improved Picture and Sound Quality by Hideo Imaizumi, Yuji Kimoto, Takeshi Ogiwara, Yoshiyuki Tsukahara, IEEE Transactions on Consumer Electronics, vol. 35, No. 3, Aug. 1989, pp. 406–414.

Primary Examiner—James J. Groody
Assistant Examiner—Jeffrey S. Murrell
Attorney, Agent, or Firm—Joseph S. Tripoli; Peter M. Emanuel; Frederick A. Wein

[57] ABSTRACT

A low audio buzz television signal processing system. Both the video IF signal and the sound IF signal are filtered by a shared SAW filter without requiring an additional surface acoustic wave (SAW) device for IF sound processing. The required Nyquist slope of the video signal is provided by a contour filter for applying a Nyquist slope characteristic.

6 Claims, 2 Drawing Sheets

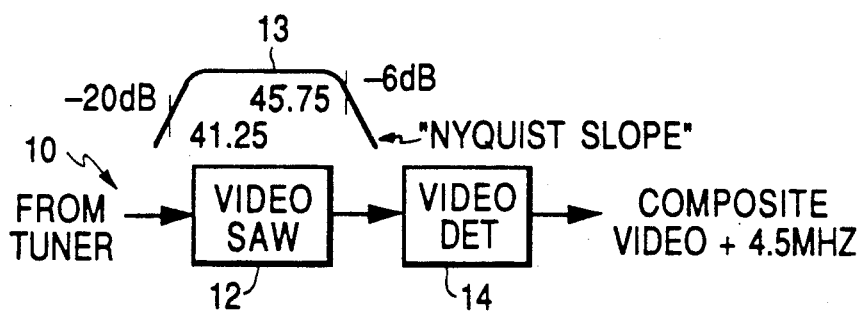
FIG. 1 *PRIOR ART*
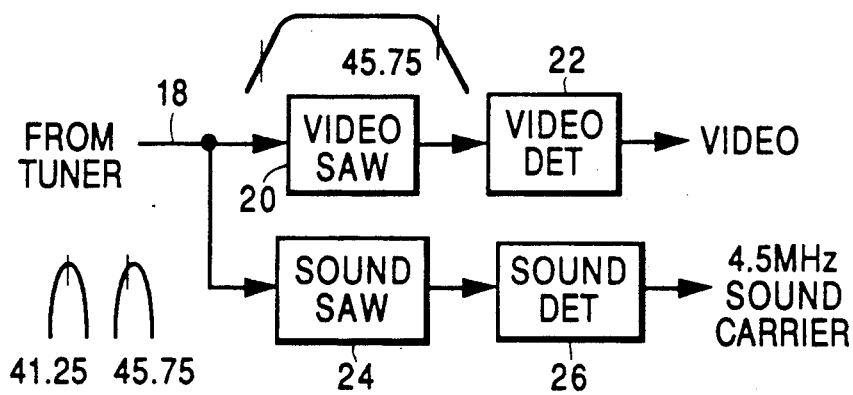
FIG. 2 *PRIOR ART*
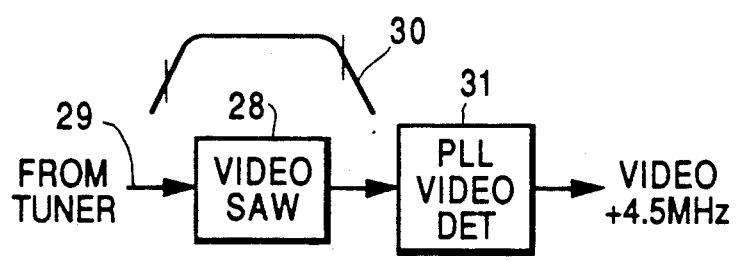
FIG. 3 *PRIOR ART*
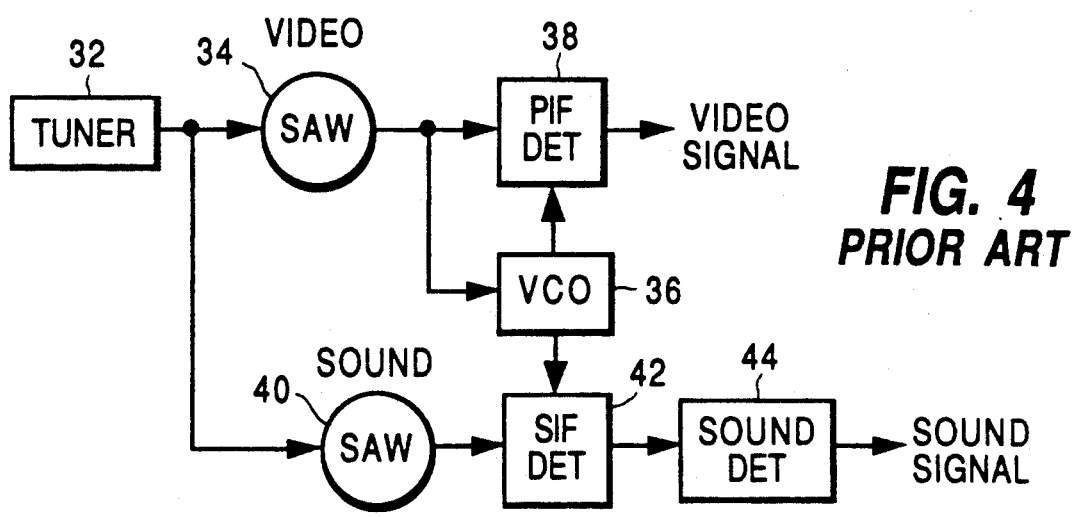
FIG. 4 *PRIOR ART*

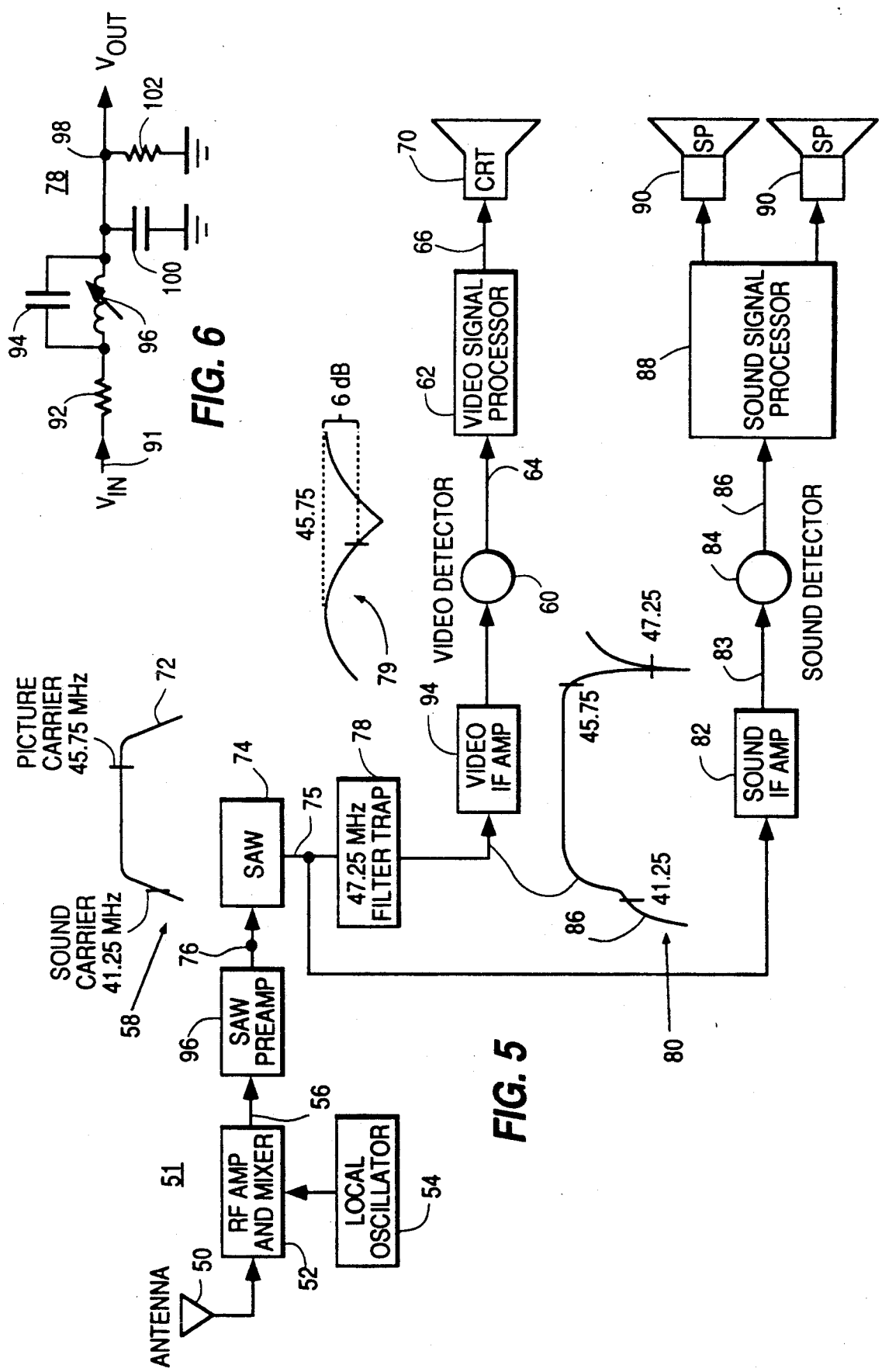

QUASI-PARALLEL IF WITH SHARED SAW FILTER

The sound transmission accompanying TV picture transmission in, for example, the NTSC system used in the United States, is a frequency modulated (FM) signal transmitted 4.5 MHz above the radio frequency (RF) picture carrier. In a typical TV receiver, the picture and sound signals are processed together through the RF stage and the mixer (sometimes called the first detector). Typically, modern TV receivers are superheterodyne receivers using a local oscillator frequency tuned above the receiving frequency. As a result, the sound and picture carrier signals appear transposed in frequency in the intermediate (IF) section, i.e., the sound carrier frequency appears 4.5 MHz below the picture carrier frequency. The IF frequencies used in the United States are effectively standardized and results in the IF picture and IF sound carrier signals being 45.75 MHz and 41.25 MHz, respectively.

As used herein and in the claims, the term television receiver is intended to include all appropriate apparatus whether or not a display device is provided, e.g., television sets and VCRs.

A number of alternatives have been employed for further processing the IF signal provided by the mixer. In the conventional intercarrier system commonly used in monophonic television receivers, the picture and sound carriers are processed after the tuner in a common IF channel. The picture information is amplitude modulated on the picture carrier and is detected by either an envelope or synchronous detector, and thereafter is processed in a video channel. To recover the frequency modulated audio information, the two IF carriers are mixed to form an intercarrier sound signal having a frequency corresponding to the difference of the carrier IF frequencies. E.g., for the NTSC system a 45.75 MHz picture carrier is mixed with a 41.25 MHz sound carrier for producing a 4.5 MHz intercarrier sound signal. The frequency modulated (FM) intercarrier sound signal is subsequently demodulated by an FM detector to produce the audio information.

The intercarrier system is subject to the introduction of interference and noise in the 4.5 MHz sound carrier signal which may cause distortion or other defects in the reproduced sound. Some forms of such interference are caused by modulations of the picture carrier signal when it is mixed with the sound carrier signal. For example, the overall frequency characteristic of the picture IF section of TV receivers is designed to accommodate vestigial sideband modulation of the picture carrier at the transmitter. As is well known, the characteristics of a typical receiver exhibit an approximately linear attenuation slope (sometimes called the "Nyquist slope") with the picture carrier frequency located on the slope 6 db down relative to a lower frequency sideband portion. As a result, the lower and higher sideband signals are asymmetrically attenuated by the Nyquist slope characteristic. A known effect of this sideband asymmetry is to produce an undesirable phenomenon known as incidental carrier phase modulation (ICPM) in the picture carrier signal which may result in the reproduced sound signal being effected by an objectionable "buzz".

Other ICPM distortion can result from a number of sources all of which have the effect of imparting undesired video frequency phase modulation onto the picture carrier, which phase modulation is subsequently transferred to the 4.5 MHz intercarrier sound signal in the receiver and also results in "buzz" distortion of the reproduced sound signal for phase modulation frequencies.

Multichannel audio for stereophonic (stereo) and bilingual broadcasting involves the use of one or more audio subcarriers for forming a composite audio signal. The composite audio signal makes it desirable that the television audio signal bandwidth be increased to approximately 90 KHz or more as compared with the 15 KHz bandwidth for a monophonic audio program. As a result, the audio buzz produced in the sound signal processing channel tends to be more severe in stereophonic receivers than in monophonic receivers. Additionally, sound detectors are more susceptible to interference at higher audio frequencies.

Alternative sound separation systems, e.g., the "split-carrier sound" and "quasi-parallel sound" systems, have been employed to overcome the "Nyquist" buzz problem. In split-carrier sound systems, after the mixer, the picture carrier signal is processed separately from the sound carrier signal for deriving the video and audio information. The intercarrier method is utilized for sound detection. A phase locked loop (PLL) provides a spectrally pure sine wave of the same frequency and phase of the picture carrier for mixing with the IF sound carrier. However, the PLL is relatively expensive to implement and the circuit requires additional amplifiers and tuned circuits as well as a more expensive integrated circuit chip. In this system the sound channel does not mix the modulated picture carrier at all and thus the audio buzz due to Nyquist ICPM as well as the other causes of buzz is greatly reduced.

In the so-called "quasi-parallel" system sound and video signals are separately amplified and demodulated in different channels. In the sound channel, the IF picture carrier is additionally separately processed without a Nyquist slope characteristic and mixed with the sound IF carrier signal to form a 4.5 MHz intercarrier sound signal. The intercarrier sound signal is subsequently demodulated to produce an audio signal which, after processing, is ultimately conveyed to a sound reproducing loudspeaker.

More particularly, in the quasi-parallel system, the sound channel includes a filter section which receives the sound and picture carriers prior to demodulation. The sound channel filter provides an input to a sound demodulating system which has a substantially symmetrical bandpass characteristic with respect to each of the sound and picture carrier frequencies and therefore does not subject the picture carrier to phase distorting Nyquist slope processing (which is required for the proper demodulation of the vestigial sideband video information in the video channel). Additional circuitry such as amplifiers and tuned circuits are also required.

In both of the alternate systems, (i.e., phase locked loop and quasi-parallel systems), SAW filters are often used. The SAW filter offers advantages in terms of small size, and reproducible performance without a need for alignment. However, the SAW filters are a relatively high cost component and often require additional preamplifier stages to make up the insertion loses of the SAW filter. The use of two SAW filters, one in each of the video and sound IF channels is not desirable. SAW filters are available as dual channel devices, and as such are particularly useful in receivers employing the quasi-parallel IF principle. However, such dual channel SAW filters are almost twice the cost of single channel SAW filters and may not eliminate the need for additional components for the respective video and sound outputs.

Accordingly, it is desirable to provide a high quality wide band audio signal processing section free of buzz which is economical to produce, with a minimum number of SAW filters.

SUMMARY OF THE INVENTION

Briefly, to this end, according to an aspect of the present invention, the video IF signal and the sound IF signals are filtered by a shared SAW filter without requiring an additional SAW device for IF sound processing. The SAW filter has a bandpass frequency characteristic not having a Nyquist slope characteristic which would otherwise produce ICPM. The input of the sound processing section is coupled to the output of the SAW filter. The required Nyquist slope for processing the video signal is provided by a contour filter. In the exemplary embodiment, the video signal is detected by a quasi-synchronous detector.

DESCRIPTION OF THE DRAWINGS

For a better understanding of the present invention, reference may be had to the accompanying drawings wherein:

FIGS. 1-4 show block diagrams of prior art configurations for deriving intercarrier sound signals in television receivers.

FIG. 5 shows a block diagram including aspects of the present invention.

FIG. 6 shows a schematic diagram of the 47.25 MHz contour filter circuit of FIG. 5.

DETAILED DESCRIPTION OF PREFERRED EMBODIMENT

FIG. 1 shows a prior art monophonic system including a sound intercarrier signal processing section. Because of the limited frequency response required for such monophonic system, "buzz" is tolerable and ICPM caused by the "Nyquist slope" and other ICPM causes are easily controllable. The IF signal is provided from a tuner 10 and fed to a video SAW 12 or other appropriate intermediate frequency bandpass amplifier having a typical bandpass characteristic 13 as shown, and thereafter fed to a video detector 14, wherein the video carrier is mixed with the sound carrier for providing a video composite signal and a sound intercarrier signal.

FIG. 2 shows one example of a so called "quasi-parallel" sound system wherein the IF signal from a tuner at 18 is fed to a video SAW 20 having a standard video bandpass characteristic (as indicated by 13 in FIG. 1) and then fed to a video detector 22 for detection of the video signal. In order to avoid ICPM, the sound signal is processed by a sound SAW 24 having symmetric bandpass shapes with respect to each of the sound carrier and the video carrier frequencies. In this manner, the parallel sound channel separately bandpass filters the sound carrier and the picture carrier signals in order to prevent Nyquist slope and other problems. The two symmetric carriers are then mixed in the sound detector 26 for deriving the 4.5 MHz intercarrier sound signal.

Another approach to providing a buzz acceptable sound is provided with the phase locked loop (PLL) which provides a signal at the video carrier frequency which is stable and fairly independent of video carrier modulation. More specifically, the phase locked loop permits mixing of a clean and frequency stable signal at the video carrier frequency fairly independent of any modulation or phase effects due to the Nyquist slope or other video modulations of the video carrier. In this regard, referring now to FIG. 3, video SAW 28 filters the IF signal derived from tuner 29 in the conventional Nyquist slope passband 30 required for processing of the video channel and such signal is fed to a phase locked loop synchronous video detector 31 in a manner analogous to the system shown in FIG. 1 except that the composite video signal and the sound intercarrier signal are derived reasonably independent of ICPM and video modulations since the signal at the video carrier frequency used for mixing is derived by a voltage controlled oscillator of the PLL.

Yet another example of the prior art using a PLL is shown in FIG. 4 wherein the IF signal derived from tuner 32 is processed by a video SAW 34 in a conventional manner and detected by a synchronous detector 38 using the output of a PLL voltage controlled oscillator (VCO) 36 fed to picture video detector 38 for deriving the detected composite video signal. The output of VCO 36 is also fed to the sound detector 42 which when mixed with the modulated sound carrier from sound SAW 40 produces the 4.5 MHz intercarrier signal which is detected at sound detector 44.

Thus FIGS. 2 through 4 show various prior art approaches thought necessary in order to provide a wide band sound signal reasonably free of buzz. In such systems either a PLL is used to derived a mixing signal, or the sound signal is separately processed using a SAW filter.

Referring now to FIG. 5 wherein the tuner, IF, and detector circuits of a television receiver are shown, a television broadcast signal received by an antenna 50 is applied to a television tuner 51 which comprises an RF amplifier and mixer 52 in combination with a local oscillator 54. Tuner 51 selectively translates the RF picture and sound carrier signals of a selected TV channel to intermediate frequency (IF) carrier signals at, e.g., 45.75 MHz, and 41.25 MHz, respectively for the NTSC system used in the United States.

The television signal processing circuitry includes an IF filtering an amplifying section, generally designated as 58, and a video detector 60. A video signal processor 62 responsive to the composite video signal developed at 64 provides a luminance signal at 66 to kinescope or CRT 70. Appropriate matrixed color signals (not shown) along with appropriate deflection signals (not shown) are also provided to CRT 70.

In a conventional intercarrier IF passband response as provided by a video SAW filter, the picture carrier signal is located 6 db down on the higher frequency slope and the IF sound carrier signal is located approximately 20 db down on the lower frequency slope so that the vestigial sideband video information can be detected without significant interference from the IF sound carrier. This is the Nyquist response which is required to properly process the video information. The SAW filter 74 used herein presents a flat response for the video carrier as shown in response 72 so as not to introduce the "Nyquist incidental carrier phase modulation" to the IF picture carrier provided at terminal 75 due to the asymmetrical attenuation of the side bands of the IF picture carrier, as discussed hereinabove. As discussed below, the Nyquist slope is provided after the sound takeoff at terminal 75 by filter 78, described in greater detail below, for processing by the video channel.

The IF signal available at terminal 75 is amplified by a sound IF amplifier 82 and is detected by sound detector 84 by mixing the picture and sound carrier signals received from SAW filter 74 for producing a 4.5 MHz intercarrier sound signal at 86. The intercarrier sound signal is detected and the resultant sound or audio information is coupled to sound signal processor 88 for decoding the sterophonic sound components and feeding them to loudspeakers 90.

More particularly, the IF signal having a picture carrier and a sound carrier modulated with video and audio information respectively, is provided at 56 and is amplified by SAW preamp 94 which typically provides anywhere from 20 to 26 db amplification to compensate for the large insertion loss of a SAW filter, which typically is around 20 db. The amplified IF signal at 76 is then passed through SAW filter 74 having a substantially flat 6 MHz bandpass characteristic.

Correct detection of the video signal requires a response characteristic shown at 80. The output signal of SAW filter 74 output is well suited for sound demodulation due to the flat response not introducing a Nyquist slope, but is thus not well suited for video. The required Nyquist slope for the video is provided by filter 78 having a trap type of characteristic which contours the signal to produce a video signal for proper detection, as discussed more fully below. The SAW filter 74 also provides a substantial desirable attenuation at 47.25 MHz to reduce adjacent channel interference, and an attenuation at 39.75 MHz (not shown).

The output signal from filter trap 78 is coupled to video IF amplifier 94 which is a conventional gain controllable amplifier having a terminal for AGC gain control (not shown).

As discussed above, the transmitted signal requires a particular video shape for proper detection, and in particular, requires a particular Nyquist slope which has the problem of introducing "buzz" in the reproduced sound. Filter 78 provides the required slope without effecting the sound IF which is taken off prior to filter 78. Thus, filter 78 contours the characteristic of the video IF and provides the Nyquist slope to the video channel, but without requiring a separate SAW filter for the sound to avoid the Nyquist slope sound buzz problem. The passband characteristic of filter 78 is shown at 79 wherein the video carrier is 6 DB down at 45.75 MHz. Additionally, filter 78 provides an additional stage of 47.25 MHz rejection for further reducing adjacent channel interference. The exemplary embodiment of filter 78 is what is commonly called a "trap", frequency elimination, or bandstop filter, depending upon how sharp the frequency rejection curve is at the selected frequency of rejection. It is within the contemplation of the present invention that filter 78 can also be a low-pass filter providing the Nyquist proper slope and attenuations at 45.75 MHz and 47.25 MHz. The implementation of filter 78 shown in FIG. 6 will be discussed below.

The type of detection shown in the exemplary embodiment is what is commonly called quasi-synchronous or pseudo-synchronous wherein the picture carrier is amplitude limited (not shown) to remove any envelope modulation present on the carrier and utilized as the reference input signal for a synchronous detector. The output signal of video IF amplifier 94 is coupled to synchronous video detector 60 wherein it is mixed with the derived picture carrier with the modulation removed (not shown) for providing a composite video signal at 64.

Thus, in summary, it is shown that IF signal processing can be performed by using only a single SAW filter for both the picture IF and the sound IF along with strategic design and placement of filter trap 78 to provide a Nyquist slope for the picture channel only.

Referring now to FIG. 6, there is shown a schematic diagram of filter 78. A resistor 92 (50 ohms) is coupled in series with the parallel circuit of a capacitor 95 (56 picofarads) and a variable inductance 96 (nominally 0.2 microhenries) between an input terminal 91 and an output terminal 98. A capacitor 100 (4.7 picofarads) and a resistor 102 (1000 ohms) shunt output terminal 98 to ground. The circuit is made adjustable to compensate for tolerances in the SAW filter and the filter 78 itself. The frequency responses of trap 78 and SAW filter 74 complement each other, i.e., trap 78 can be adjusted to compensate for defects in the frequency response of the SAW filter, such as a high frequency roll-off. Filter 78 is adjusted for a 6 db attenuation at 45.75 and for a peak at about 44 MHz to improve the fidelity of the Nyquist slope. The trap is tuned to 47.25 MHz.

Thus, it is possible as disclosed herein, to produce an acceptable low level buzz free stereo signal using more economical circuitry than that employed in the prior art. The disclosed apparatus permits only one SAW filter (with related circuits) to be used and does not require a phase locked loop (PLL) synchronous detector which requires a relatively more expensive integrated circuit chip and extensive external circuitry. However, it should be noted that a PLL can be utilized if desired. The cost of a dual SAW filter is saved. In addition to providing the conventional Nyquist slope, there is better 47.25 MHz rejection compared to a conventional filter alone.

What is claimed is:

1. In a television receiver having a source of intermediate frequency (IF) signal including a picture carrier and a sound carrier modulated with video and audio information respectively, the picture carrier and the sound carrier having a predetermined frequency separation therebetween, apparatus for processing said signal comprising:

a first IF bandpass filter means for filtering said IF signal to produce a first filtered version of said IF signal, said first bandpass filter means having a bandpass characteristic encompassing the frequencies of said sound carrier and said picture carrier, and wherein amplitudes at adjacent frequencies above and below the frequency of said picture carrier are substantially equal, a second IF filter means for filtering said first filtered version of the IF signal to provide a second filtered version of the first filtered version of the IF signal, said second filter means having a characteristic wherein the amplitudes of adjacent frequencies above and below the frequency of said picture carrier are unequal, a video processing means including video detector means having an input coupled to the output of the second IF filter means for providing a detected video signal from the second filtered version IF signal, and sound processing means including sound detector means having an input coupled to the output of the first IF bandpass filter means for providing a detected sound intercarrier signal from the first filtered version of the IF signal including said sound carrier and said picture carrier.

2. In a television receiver having a source of intermediate frequency (IF) signal including a picture carrier and a sound carrier modulated with video and audio information respectively, the picture carrier and the sound carrier having a predetermined frequency separation therebetween, apparatus for processing said signal comprising:

a first IF bandpass filter means for filtering said IF signal to produce a first filtered version of said IF signal, said first bandpass filter means having a frequency characteristic wherein amplitudes at adjacent frequencies above and below the frequency of said picture carrier are substantially equal, a second IF filter means for filtering said first filtered version of the IF signal to provide a second filtered version of the IF signal, said second filter means providing trap attenuation of a selected frequency along a slope of the bandpass region of the first IF bandpass filter means such that the amplitudes of adjacent frequencies above and below the frequency of said picture carrier are unequal, a video processing means including video detector means having an input coupled to the output of the second IF filter means for providing a detected video signal from the second filtered version IF signal, and sound processing means including sound detector means having an input coupled to the output of the first IF bandpass filter means for providing a detected sound intercarrier signal from the first filtered version of the IF signal.

3. In a television receiver having a source of intermediate frequency (IF) signal including a picture carrier and a sound carrier modulated with video and audio information respectively, the picture carrier and the sound carrier having a predetermined frequency separation therebetween, apparatus for processing said signal comprising:

a first IF bandpass filter means comprising a SAW filter for filtering said IF signal to produce a first filtered version of said IF signal, said first bandpass filter means having a characteristic wherein amplitudes at adjacent frequencies above and below the frequency of said picture carrier are substantially equal, a second IF filter means comprising a trap for filtering said first filtered version of the IF signal to provide a second filtered version of the IF signal, said second filter means having a characteristic wherein the amplitudes of adjacent frequencies above and below the frequency of said picture carrier are unequal, a video processing means including video detector means having an input coupled to the output of the second IF filter means for providing a detected video signal from the second filtered version IF signal, and sound processing means including sound detector means having an input coupled to the output of the first IF bandpass filter means for providing a detected sound intercarrier signal from the first filtered version of the IF signal.

4. In a television receiver having a source of intermediate frequency (IF) signal including a picture carrier and a sound carrier modulated with video and audio information respectively, the picture carrier and the sound carrier having a predetermined frequency separation therebetween, apparatus for processing said signal comprising:

a first IF bandpass filter means for filtering said IF signal to produce a first filtered version of said IF signal, said first bandpass filter means having a characteristic wherein amplitudes at adjacent frequencies above and below the frequency of said picture carrier are substantially equal, a second IF filter means for filtering said first filtered version of the IF signal to provide a second filtered version of the first filtered version of the IF signal, said second filter means frequency contouring the video IF signal for providing a Nyquist slope not provided by the first IF filter means so that the amplitudes of adjacent frequencies above and below the frequency of said picture carrier are unequal, a video processing means including video detector means having an input coupled to the output of the second IF filter means for providing a detected video signal from the second filtered version IF signal, and sound processing means including sound detector means having an input coupled to the output of the first IF bandpass filter means for providing a detected sound intercarrier signal from the first filtered version of the IF signal.

5. In a television receiver having a source of intermediate frequency (IF) signal including a picture carrier and a sound carrier modulated with video and audio information respectively, the picture carrier and the sound carrier having a predetermined frequency separation therebetween, apparatus wherein the video IF signal and the sound IF signal are both filtered by a common filter having a frequency response which is substantially flat through a region extending above and below the frequency of the picture carrier, and the video IF signal is further filtered by a second filter for frequency contouring the video IF signal according to the Nyquist slope not provided by the first filter with the sound carrier not being subject to Nyquist slope attenuation of the second filter.

6. In a television receiver having a source of intermediate frequency (IF) signal including a picture carrier and a sound carrier modulated with video and audio information respectively, the picture carrier and the sound carrier having a predetermined frequency separation therebetween, apparatus for processing said signal comprising:

a first IF bandpass filter means for filtering said IF signal to produce a first filtered version of said IF signal, said first IF bandpass filter being a SAW filter, a second IF filter means for filtering said first filtered version of the IF signal to provide a second filtered version of the first filtered version of the IF signal, said second IF filter frequency contouring the first filtered version of the video IF signal for providing a Nyquist slope not provided by the first IF bandpass filter, a video processing means including video detector means having an input coupled to the output of the second IF filter means for providing a detected video signal from the second filtered version of the IF signal, and sound processing means including sound detector means having an input coupled to the output of the first IF bandpass filter means for providing a detected sound intercarrier signal from the first filtered version of the IF singal.

* * * * *